United States Patent [19]

Nelson

[11] 4,445,456

[45] May 1, 1984

[54] AIR FILTER RESTRICTION INDICATING DEVICE

[75] Inventor: Joseph N. Nelson, Waterloo, Iowa

[73] Assignee: Engineered Products Company, Waterloo, Iowa

[21] Appl. No.: 273,699

[22] Filed: Jun. 16, 1981

Related U.S. Application Data

[63] Continuation of Ser. No. 131,456, Mar. 18, 1980, abandoned, which is a continuation of Ser. No. 11,410, Feb. 12, 1979, abandoned, which is a continuation of Ser. No. 916,776, Jun. 19, 1978, abandoned.

[51] Int. Cl.³ ................. B01D 35/14; G01L 7/08
[52] U.S. Cl. .................... 116/268; 55/274; 73/744; 116/283
[58] Field of Search ....... 116/272, 268, 274, DIG. 42, 116/273, 271; 73/709, 56, 145

[56] References Cited

U.S. PATENT DOCUMENTS

| | | | |
|---|---|---|---|
| 1,546,409 | 7/1925 | Schmidt | 73/315 |
| 3,066,527 | 12/1962 | Stein | 73/118 |
| 3,068,831 | 12/1962 | Witchell | 116/267 |
| 3,247,824 | 4/1966 | Rodgers | 116/271 |
| 3,443,365 | 5/1969 | Lee et al. | 55/274 |
| 3,465,707 | 9/1969 | Kashiwaba | 116/268 |
| 3,779,080 | 12/1973 | Smith | 73/709 |
| 3,939,457 | 2/1976 | Nelson | 116/DIG. 25 |
| 4,033,733 | 1/1977 | Nelson | 55/274 |
| 4,100,878 | 7/1978 | Leinfelt | 116/268 |

Primary Examiner—Daniel M. Yasich
Attorney, Agent, or Firm—Allegretti, Newitt, Witcoff & McAndrews, Ltd.

[57] ABSTRACT

An air filter restriction indicating device communicating with the supply of air passing from an air filter to the air intake of an internal combustion engine. The indicating device senses a decrease in the supply of air drawn through the air filter by the engine based upon changes in the amount of vacuum in the negative side of the air supply, the amount of restriction being indicated by the movement of an indicating device. Improved means included in the indicating device senses the movement of the indicating device and progressively locks the indicating device into various indicating positions as the vacuum increases due to an increased restriction of the filter, so that the maximum reading of restriction achieved during engine operation remains visible to the operator or maintenance personnel even after the engine is turned off.

8 Claims, 5 Drawing Figures

AIR FILTER RESTRICTION INDICATING DEVICE

This application is a continuation of application Ser. No. 131,456, filed Mar. 18, 1980, now abandoned, which was a continuation of application Ser. No. 011,410, filed Feb. 12, 1979, now abandoned, which was, in turn, a continuation of application Ser. No. 916,776, filed June 19, 1978, now abandoned.

BACKGROUND OF THE INVENTION

The improved device of the present invention is used in connection with an air filter for internal combustion engines. It is particularly useful for application to turbocharged diesel engines on trucks, tractors and industrial and marine applications. The device indicates and locks itself in position when the air filter has become so loaded with contaminants that the supply of air required by the engine for its operating efficiency is not being drawn through the filter and that the filter therefore requires cleaning or replacement. It also locks itself in various positions so as to provide a continuous indication as to how much useful remains in the air filter before it should be cleaned or changed.

Heretofore, flag, gauge or warning light indicators have been used to indicate when an air filter is filled with dust or other contaminants which restrict the air flow to the engine but do not give gradual fixed readings from a clean to a dirty filter condition. Many operators unnecessarily and improperly clean or change an air filter element rather than take a chance of having a warning signal appear even though the filter is not full of contaminants. Over-servicing prevents a normal dust build-up from filtering out the fine particles that lodge in the pores of the filter paper element of, for example, a dry air filter. This shortens the life of the filter element and more frequent cleaning is needed, which increases the risk of filter element damage and improper installation. A hole as small as 1/16" can pass enough dust to ruin an engine within eight hours of operation. Most air cleaners are designed to retain a certain amount of dust until 25" of vacuum is reached. At that point the air filter is full and is incapable of taking any more dust without a rapid increase in vacuum downstream of the filter elements. The high vacuum can pull dust through the filter element and may even pull particles of the filter element and oil from the engine crank case into the combustion chamber, particularly with turbo-charged diesel engines. Such dust, contaminants or lack of oil may ruin the engine in a relatively short time.

With the flag or switch type indicators or with a continuously reading or dial gauge, it is virtually impossible to ascertain how much capacity is left in the air filter when the engine is shut down or turned off. Furthermore, dial type gauges vary the indication of vacuum depending on the load on the engine while the engine is in operation. The load and the engine air flow may be highest when the operator of the vehicle may not be able to readily visually observe the gauge or indicator. When less load is placed on the engine, an erroneous gauge reading may be indicated. When the engine is stopped completely, the gauge or indicator does not continue to indicate the true condition of the air filter as when the engine was under maximum load condition. Therefore, the maintenance personnel or the driver of the vehicle may not know the true condition of the air filter at the end of a run, since operators rarely maintain a log of readings of the air filter indicator. To make such an observation, the engine must be restarted and preferably operated with a dynamometer to simulate maximum load conditions. Such procedures take considerable time and expense and if not done frequently, may result in the engine dangerously operating with an overloaded air filter.

Furthermore, the ideal situation when a dial type gauge is used is for the operator of the engine to monitor and log and report maximum readings. It is difficult to train operators to follow such procedures, and many times the operator neglects to do so, with resultant poor engine operation.

In addition, more fuel is used to maintain horsepower at above 20" of vacuum, and if cleaning the air filter does not reduce the vacuum below 20", the filter element should be replaced to avoid frequent cleaning and to save fuel.

The device herein gives a gradual reading from a clean filter condition to a dirty filter condition and automatically locks into the highest clogged air flow condition (that is, dirty filter condition) experienced during engine operation so that it may be read after shutdown and may also be monitored during engine operation.

Furthermore, after cleaning or replacement, it is easy to reset the indicator and it will then assume a position away from a danger line on the indicator showing how much air filter use is left. Obviously air filters should be replaced when there is not much filter capacity left after cleaning.

The device herein is designed to give a continuous, progressive reading to indicate the build-up of contaminants within the air filter and to indicate the condition of the filter through eliminating guess work as to the time when cleaning or replacement of an air filter is approaching because the condition of the filter is indicated by the movement of an indicating member with respect to a visible scale. Furthermore, the indicating device indicates the condition of contamination of the air filter progressively and locks itself into its highest vacuum indicating position, whereby regardless of whether or not the engine to which it is attached is operating, there is a positive indication of the condition of contamination of the air filter and an indication to the extent to which the air filter is still useful.

Indicators for registering the restriction present in air filters have been utilized heretofore and are the subject matter of patents such as U.S. Pat. Nos. 3,068,831 Witchell, 3,443,365 Lee and 3,465,707 Kashiwaba. The indicators disclosed in these patents lock themselves into position only when they have indicated a restriction in the air filter which indicates that the filter life is expended. Such high restriction may occur at a time unknown to the operator of the vehicle, particularly when intent on driving, for example, when passing another vehicle on a hill and he will, therefore, not be aware of the degree to which the air filter is contaminated. There is no progressively locked indication of contamination as in the case of the device of the present invention.

Other prior patents in this field are Nelson U.S. Pat. Nos. 3,939,457 and 4,033,733. However, the devices disclosed in these prior Nelson patents do not include the progressive locking feature of the present invention.

It is therefore an object of the invention to provide a contamination indicating device for an air filter for internal combustion engines, which device provides a positive indication of the increasing contamination of the air filter by having the contamination indicating member therein progressively lock itself into various indicating positions and to maintain the indication of the highest amount of contamination even in the absence of operation of the engine.

SUMMARY OF THE INVENTION

The present invention relates to an air restriction indicating device for use in connection with an air filter for internal combustion engines which indicates and maintains a progressive and continuous showing of the degree of contamination of the air filter so that air filter servicing may be scheduled before the filter life is expended and before higher fuel consumption occurs.

PREFERRED DESCRIPTION OF THE DRAWINGS

DESCRIPTION OF THE PREFERRED EMBODIMENT

Figure 1:
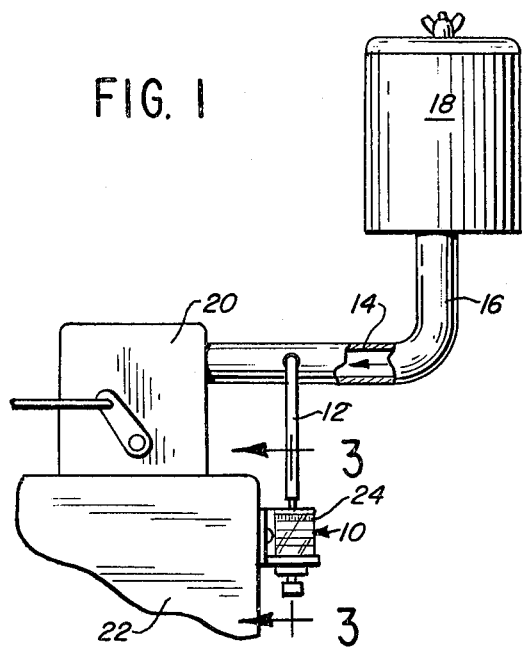
FIG. 1 is a view in elevation showing the device herein in its operating position.
Figure 2:
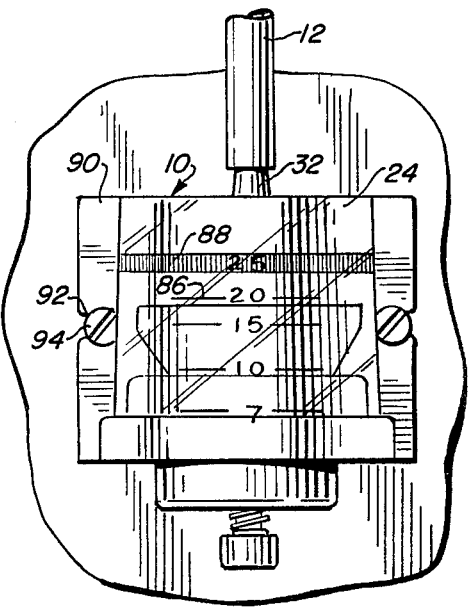
FIG. 2 is a view inside elevation of the indicating device shown in FIG. 1.

Referring to the drawings, the device 10 forming an air filter restriction indicating device constructed and operated in accordance with the invention is shown in an operating position connected by an air line 12 to communicate with negative air pressure zone at the air stream 14 passing through a stack 16 from an air filter 18 comprising an intake air side to the air intake 20 of an internal combustion engine 22, of which only a portion is shown.

The device 10 comprises a substantially cylindrical housing 24 preferably formed of a suitable, transparent plastic material and consists of an annular side wall 26 and upper or first end wall 28 defining an overall generally cylindrical chamber 30 within said housing. Upstanding centrally from said upper end wall 28 is a neck portion 32 having a passage 34 therethrough for communication through the air line 12 between the air stream passing through the air line 12 and the chamber 30.

An annular outward offset portion 36 is formed about the bottom portion of said side wall and an annular right angled shoulder 38 is shown formed at the upper inner side of said offset portion as an underlying annular inwardly extending flange 39.

Figure 3:
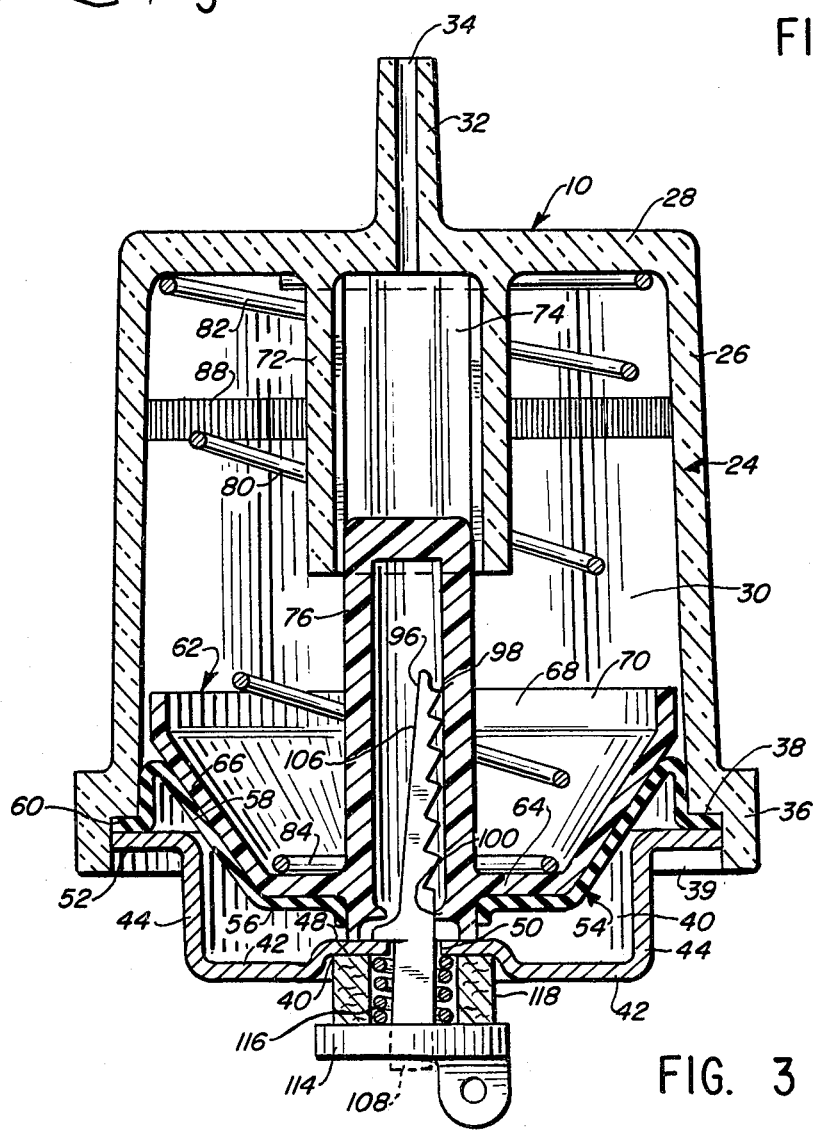
FIG. 3 is a vertical sectional view taken on line 3—3 of FIG. 1 on an enlarged scale showing the diaphragm in its infold position.
Figure 4:
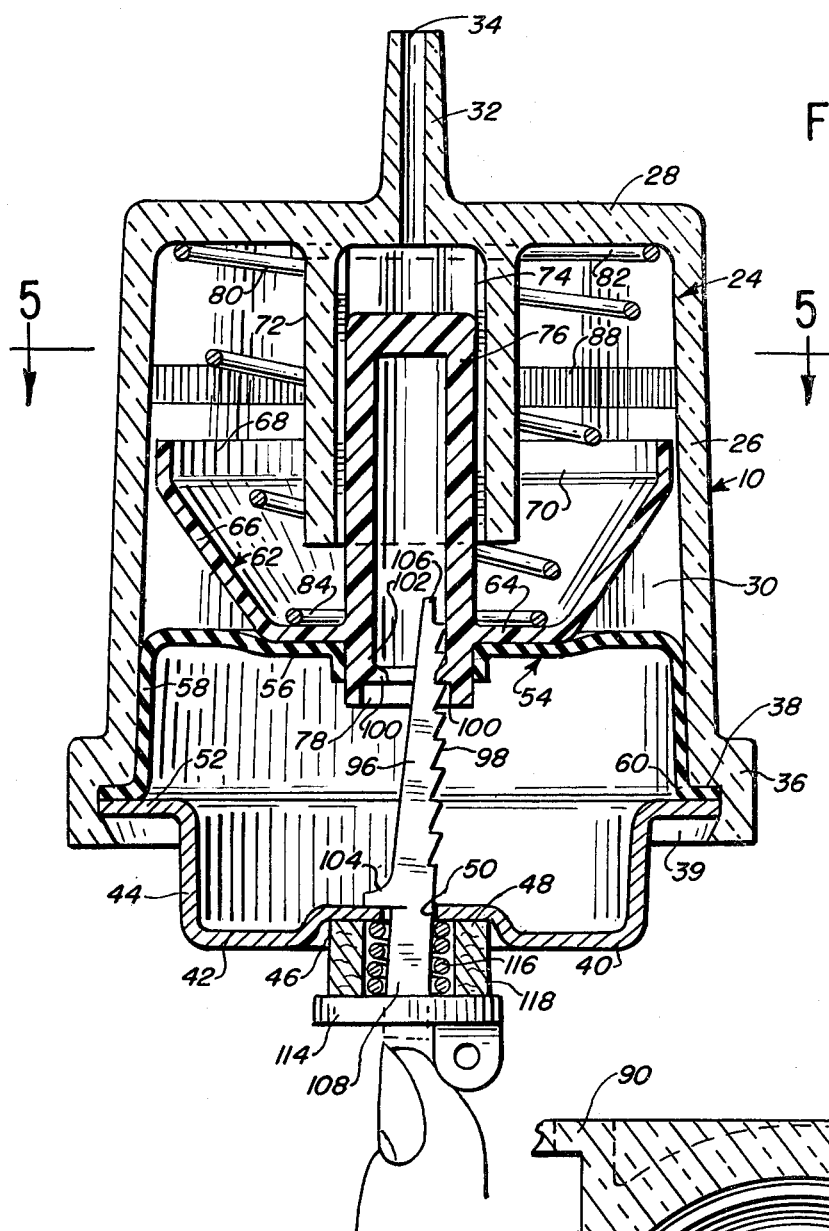
FIG. 4 is a view similar to FIG. 3 showing a different operating position wherein the diaphragm is close to its outfold position and FIG. 5 is a view in horizontal section taken on line 5—5 of FIG. 4.

Forming and defining the lower or second end portion of said housing 26 is a relatively short cylindrical cup shaped member 40 which may be a metal stamping or plastic molding and which has a lesser diameter than that of said housing. The member 40 has an end or bottom wall 42 and an annular side wall 44. The member 40 also defines, along with the housing 24, the overall chamber 30. The end wall 42 has a a downwardly facing cylindrical recess 46, as shown in FIGS. 3 and 4, formed therein with the bottom wall 48 of said recess having a central opening or hole 50 therethrough.

The side wall 44 of said member 40 terminates in a right angled flange 52 of a width to be set upon said annular flange 38.

An inverted or cup-shaped diaphragm 54 formed of pliable plastic having an end or bottom wall 56 and a side wall 58, terminating in an annular flange 60, is disposed within said housing. Said flange 60 is disposed to overlie said flange 52 and to underlie said flange 38. A suitable adhesive (not shown) may secure said flanges 52 and 60 between said shoulder 38 and the flange 39. As best shown in FIGS. 3 and 4, the diaphragm 54 serves to divide the overall chamber 30 into two parts: an upper or first chamber adjacent to the upper end of the housing 24, that is, adjacent to the upper end wall 28; and a lower or second chamber adjacent to the lower end of the housing, that is adjacent to the member 40.

Seated upon and either adhesively or mechanically secured to said diaphragm 54 by a washer (not shown) is an upright tapered cup-shaped member 62 formed of rigid plastic. The member 62 has a bottom wall 64 overlying the bottom wall 56 of said diaphragm 54 and has an annular flared side wall 66 terminating in a vertical rim portion 68. A brightly colored ring 70 is on the rim portion 68 to form a readily visible indication within the housing 24 which by its vertical position indicates the amount of restriction or extent of contamination in the air filter.

The bottom wall 64 of said member 62 has a substantially narrower width than the underlying walls 56 and 58 of said diaphragm as indicated in FIG. 4, wherein the diaphragm 54 is shown adjacent to its outfold position.

Said end wall 28 has a central depending cylindrical boss 72. A central bore 74 is in the boss 72.

The bottom wall 64 of the member 62 includes an upstanding tubular guiding member 76 having a closed upper end portion and an open lower end portion 78 extending through and being secured to the underlying central bottom wall 56 of the diagram 54. The upper end portion of the member 76 is slidably disposed in the bore 74 so as to guide the vertical movement of the member 62. Said guiding member 76 is of such a length as not to be fully withdrawn from within said bore when said diaphragm is folded in upon itself, that is, when the diaphragm is in its infold position as indicated in FIG. 3.

Disposed within the overall chamber 30 is a tapered coil spring 80. The upper end portion 82 of the spring 80 bears against the inner side of said end wall 28. The lower end portion 84 of the spring 80 is seated against the inner side of the bottom or end wall 64 of the cup-shaped member 62.

The upper or first chamber of the overall chamber 30 is sealed away from the outer atmosphere by being in direct communication with the air line 16. Thus airborne contaminants in the atmosphere cannot affect the condition or operation of either the indicating member 62 or the spring 80.

Appearing on the side wall 26 of the housing are vertically spaced horizontal lines 86 indicating linear restriction levels of the filter, and indicating operating ranges with an uppermost band 88 which when reached by the rim portion 68 indicates full restriction. The particular indicia indicated is merely for illustration.

Integral with the housing is a mounting plate 90 indicated as being rectangular in form. Notches 92 are formed at each side edge portion 94 of the plate 90 to accommodate appropriate fastening means to secure the same as to the instrument panel of a vehicle.

The particular novelty of the device will now be described which comprises the lock-up feature whereby the degree of restriction is locked into the scale as the restriction advances until manually released.

Extending upwardly into said guiding member 76 is an elongated locking member 96 angled as shown at its upper end 106 and having notches 98 formed on its side. Corresponding complementary protruding ridges or notches 100 are formed in an inner adjacent wall portion 102 of the guiding member 76. Said notches 100 are so formed that relative upward movement of said member 96 is permitted but it is locked against downward movement by interengagement of said notches 98 and 100. In other words, upward movement of the member 76, relative to the member 96, is permitted because the notches 98 can slide over the notches 100. In contrast, downward movement of the member 76 (and of course, the member 62), relative to the member 96, is prevented, so long as the member 96 remains deposed as illustrated in FIG. 4, because of the interengagement between the notches 98 and 100.

Figure 5:
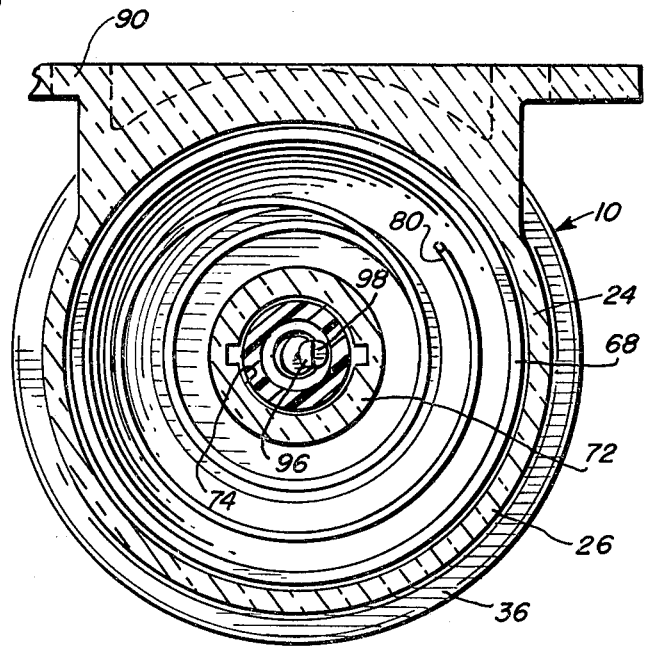

As illustrated in FIGS. 3-5, the locking member 96 extends through the hole 50 in the bottom wall 42. The locking member 96 has a flange 104 adjacent its lower end portion 108, as shown in FIGS. 3 and 5. The flange 104 rests freely on the inner side of bottom wall 42 to retain the member 96 in position but to afford movement thereof through hole 50 which is larger than extension 108.

The upper end portion 106 of said locking member is offset as shown from its lower portion 108. The lower portion is a cylindrical depending portion extending freely through the hole 50.

Said external lower portion 108 is connected to an operating member or button 114. A coil spring 116 is carried on the button 114, extends between said button and the adjacent bottom wall 42, and urges said member 96 in a direction downwardly and laterally. The lateral movement of the member 96 results from the engagement of said flange 104 resting on said bottom wall 42. As a result, the upper end portion 106 is cocked to an off-center position, as shown in FIGS. 3 and 4.

Surrounding said coil spring 116 is a compressible annular filter 118 which filters air at atmospheric pressure entering the first or lower chamber, that is, the portion of the chamber 30 below the diaphragm 54, through the hole 50.

When it is desired to reset the indicator after cleaning or replacement of the air filter and after the member 96 has been locked up, as shown in FIG. 4, the thumb of the operator, as shown in FIG. 4, is pressed against the button 114 to move the member 96 from its off-center position to a vertical dotted line position by reason of the cooperation between the flange 104 and the bottom wall 42 and the enlarged hole 50, as shown in FIG. 4, to release the notches 96 and 100 and permit spring 80 to return the indicating assembly to its lower home position, as shown in FIG. 1, and indicating that the lowest amount of inches of water vacuum is present in the negative air supply to the engine. In other words, as the diaphragm 54 is moved from its infold position, as shown in FIG. 3, toward its outfold position, as shown in FIG. 4, due to an increase in vacuum in the upper or first chamber, the cup-shaped member 62 similarily moves upwardly. Relative upward movement between the member 76 of the cup-shaped member 62 and the locking member 96 can occur because the notches 98 on the member 96 can slide over the notches 100 on the member 76. If the vacuum in the upper or first chamber should decrease (as for example, when the engine is turned off), the diaphragm 54 would remain in the maximum outfold position which it had reached, in spite of the bias of the spring 80, because of the engagement between the notches 98 and 100.

If it is desired to permit the diaphragm 54 to return to its infold position, as shown in FIG. 3, a person need only push the button 114, as shown in FIG. 4, against the bias of spring 116. This will cause the locking member 96 to pivot, about the flange 104, from its cocked, off-center position, shown in FIGS. 3 and 4, to a vertical position where the notches 98 can no longer engage the notches 100. The bias of the spring 80 then readily returns the diaphragm 54 to its infold position shown in FIG. 3.

It will be seen from the foregoing that I have provided an efficiently operating air filter gauge, or detection device, which is simply constructed of inexpensive stampings and molded plastic parts which gives a clear indication of the remaining usefulness of an air filter and also positively indicates when the air filter requires or is approaching attention for cleaning or replacement, which indication is continuously visible and remains at a point which is controlled by the highest amount of restriction in the air filter. This invention has been thoroughly tested and found to be completely satisfactory for accomplishment of the purpose set forth above.

While a preferred embodiment of the invention has been shown and described, it is to be specifically understood that the same is capable of modification without departure from the spirit and scope of the appended claims.

What is claimed is:

1. An improved restriction indicating device for an air filter used with an internal combustion engine where the improved indicating device is in communication with the air flowing from the air filter to the air intake of the internal combustion engine, the improved indicating device comprising:

a housing having a first end, a second end, and a side wall that includes a transparent portion; the first end, the second end and the side wall defining an overall chamber in the housing;

a flexible diaphragm disposed within the housing, with the diaphragm having a central portion and having an edge portion secured to the housing so that the diaphragm divides the overall chamber into a first chamber, adjacent to the first end of the housing, and a second chamber, adjacent to the second end of the housing; the central portion of the diaphragm being movable between an infold position wherein it is more closely adjacent to the second end of the housing and an outfold position wherein it is more closely adjacent to the first end of the housing;

an indicating member that is disposed within the first chamber in the housing and that is carried by and movable with the diaphragm; the indicating member being visible through the transparent portion of the side wall of the housing at least as the diaphragm moves between its infold position and its outfold position;

means for permitting communication between the first chamber in the housing and the air flowing from the air filter to the air intake of the internal combustion engine;

means, including an opening in the second end of the housing, for permittng communication between the atmosphere and the second chamber in the housing;

a coil compression spring disposed in the first chamber of the housing, the compression spring being biased between the first end of the housing and the indicating member, with the bias of the compression spring being sufficient to move the diaphragm to its infold position when the vacuum in the first chamber is relatively low, as when a new air filter is initially used, but permitting the diaphragm to move from its infold position toward its outfold position in response to increases in the vacuum in the first chamber;

lock-up means for progressively locking the indicating member in the various positions which it attains within the first chamber as the diaphragm moves from its infold position to its outfold position and for maintaining the indicating member in its last such position even though there may thereafter be a subsequent decrease in the vacuum in the first chamber, the lock-up means including a tubular member carried by and movable with the central portion of the diaphragm, with the tubular member having a closed end that is adjacent to the first end of the housing and having an open end that is adjacent to the second end of the housing and that is in open communication with the second chamber; the lock-up means also including an elongated locking member having a first end and a second end, the locking member being supported by the second end of the housing so as to permit movement of the first end of the locking member between a first position and a second position; the first end of the locking member being disposed, when the first end of the locking member is in its first position, adjacent to the open end of the tubular member; the second end of the locking member projecting from the second chamber through the opening in the second end of the housing; the first end of the locking member and the open end of the tubular member having interengagable notches thereon that are adapted to be engaged when the first end of the locking member is in its first position, with engagement between the notches permitting the diaphragm to move from its infold position to its outfold position but preventing the diaphragm from returning to its infold position; and means for selectively disengaging the interengagable notches so as to permit the diaphragm to return to its infold position when the vacuum in the first chamber is relatively low.

2. The improved restriction indicating device described in claim 1 which includes means for guiding the indicating member as the diaphragm moves between its infold position and its outfold position.

3. The improved restriction indicating device described in claim 2 wherein the guiding means includes a centrally disposed tubular hub portion mounted on the first end of the housing and projecting into the first chamber toward the second end of the housing; and wherein the closed end of the tubular member projects into the first chamber and protrudes into and is closely slidable within the tubular hub portion as the diaphragm moves between its infold position and its outfold position.

4. The improved restriction indicating device described in claim 1 wherein the locking member is supported within the opening in the second end of the housing; wherein the first end the locking member extends into the tubular member; and wherein notches are formed on the first end of the locking member and are adapted to engage notches on the open end of the tubular member so as to progressively lock and maintain the indicating member in the last position which it attains as the diaphragm is moved from its infold position to its outfold position; and wherein the disengaging means includes means for moving the locking member from its first position to its second position where there is no engagement between the interengagable notches.

5. The improved restriction indicating device described in claim 4 wherein the second end of the locking member extends through the opening in the second end of the housing and projects from the housing; and wherein the locking member is pivotable about a portion of the side of the opening in the second end of the housing so that the first end of the locking member moves laterally from its first position to its second position.

6. The improved restriction indicating device described in claim 5 wherein a second compression spring is disposed between the projecting second end of the locking member and the second end of the housing and biases the first end of the locking member to its first position; wherein movement of the second end of the locking member toward the second end of the housing, against the bias of the second spring, causes the locking member to pivot about said portion of the side of the opening in the second end of the housing so as to move the first end of the locking member from its first position to its second position.

7. The improved restriction indicating device described in claim 6 which includes means for guiding the indicating member as the diaphragm moves between its infold position and its outfold position; and wherein the opening in the second end of the housing is centrally disposed.

8. The improved restriction indicating device described in claim 7 wherein the guiding means includes a centrally disposed tubular hub portion mounted on the first end of the housing and projecting into the first chamber toward the second end of the housing; wherein the closed end of the tubular member projects into the first chamber and protrudes into and is closely slidable within the tubular hub portion as the diaphragm moves between its infold position and its outfold position; and wherein the tubular hub portion and the tubular hub are axially aligned.

* * * * *